Patented Aug. 3, 1926.

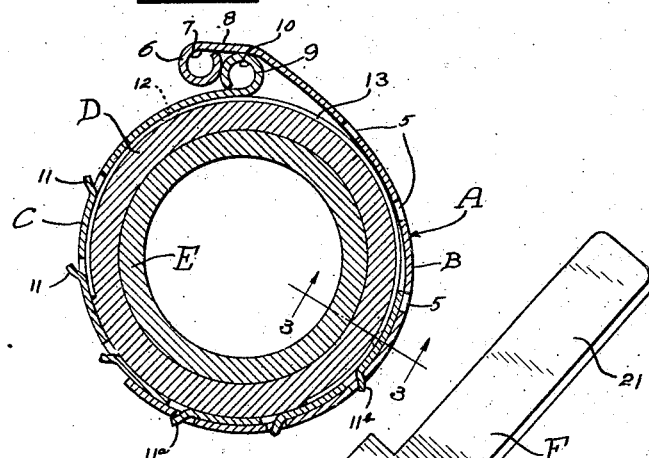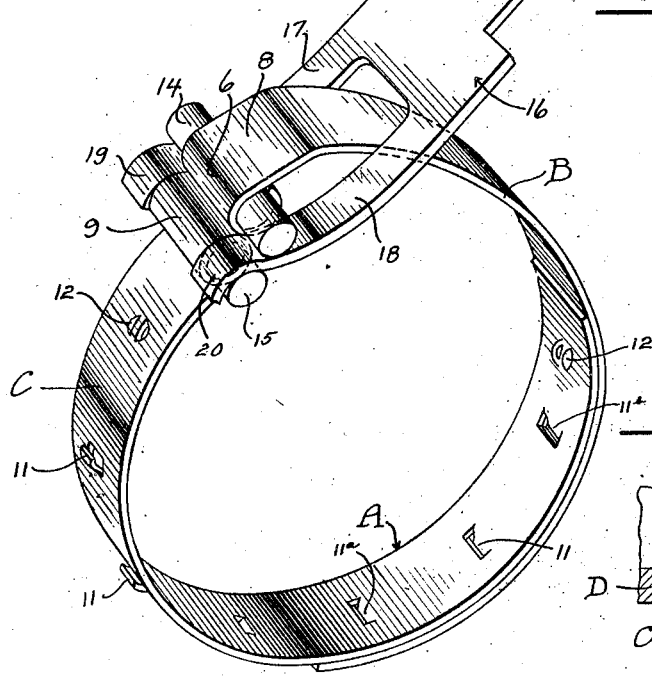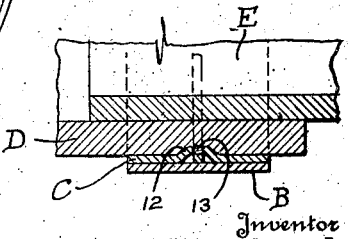

1,594,467

UNITED STATES PATENT OFFICE.

RALPH W. PHILBROOK, OF SHERMAN, CALIFORNIA, ASSIGNOR TO PHILBROOK SPRING PIPE CLAMP COMPANY, OF LOS ANGELES, CALIFORNIA, A PARTNERSHIP COMPOSED OF R. W. PHILBROOK, M. F. PRESCOTT, C. B. MISKIMONS, AND J. R. PRESCOTT.

HOSE CLAMP.

Application filed March 18, 1925. Serial No. 16,494.

The present invention relates to clamps, and more particularly to that type of clamp generally employed for clamping a hose about a pipe, for sealing the joint between the hose and the pipe against leakage; and embodies certain cooperative interengaging latch parts substantially as disclosed in Patent No. 1,474,550 granted to me on November 20, 1923.

The primary object of the present invention is the provision of an improved clamp of this character which is extremely simple in construction, and which may be readily adjusted to accommodate various sizes of hose.

A further object of this invention is the provision of an improved adjustable hose clamp which may be detachably positioned upon the hose in a facile manner, without necessitating the employing of a clamping bolt for drawing the clamp into binding engagement about the hose.

A still further object of the invention is the provision of a separable hose clamp of the afore-mentioned character which embodies novel features of construction whereby the sections may be snapped together throughout the greater range of adjustment, so that the sections will retain their assembled or adjusted relation without liability of coming apart prior to actual clamping of the device about the hose.

A still further object of the invention is the provision of a clamp of the above mentioned character which embodies a simple detachable arrangement for placing the clamp in a locked position about the hose.

Other objects and advantages of this invention will be apparent during the course of the following detailed description, taken in connection with the accompanying drawing, forming a part of this specification, and in which drawing:—

Figure 1 is a perspective view of the improved hose clamp showing details of construction, and showing means to facilitate its being clamped about a hose.

Figure 2 is a circumferentially extending sectional view taken through the improved hose clamp, and showing the same in locked adjusted position about a hose for sealing the connection between the hose and a pipe section against leakage; and, Figure 3 is a transverse section on line 3—3 of Figure 2, looking in the direction of the arrows.

Referring to the drawing in detail, wherein for the purpose of illustration is shown but the preferred embodiment of this invention, and wherein similar reference characters designate corresponding parts throughout the several views; the letter A generally designates the improved clamp comprising a pair of separable sections B and C adapted to be clamped about a yieldable tubing D for binding the tubing into tight leak proof engagement about a pipe, conduit, or analogous unit E; and F means detachably associated with the clamp A to facilitate its attachment into a locked position about the tubing or hose D.

The clamp A is preferably formed from strips of metal of suitable lengths, and having sufficient flexibility as to permit of the clamp conforming to the hose about which it is positioned.

Referring first to the clamp section B which is of arcuate semi-circular formation and which may be termed the outer section, the same is provided with a plurality of equidistantly spaced apart apertures 5 preferably having straight side walls extending transversely of the section, and in parallel relation to one another. The normally free end of the section B is formed with a rolled sleeve-portion 6 which extends inwardly of the concaved surface of the section, and provides a passageway 7 extending transversely of the free end of the section. This section B adjacent the sleeve portion 6, is preferably formed with a flat portion 8 adapted to extend rearwardly a short distance from the sleeve 6, and the purpose of which will be subsequently explained.

The clamp section C, which is also of arcuate semi-circular formation, and which may be termed the inner section, has its normally free end provided with a rolled sleeve portion 9 which extends outwardly or laterally of the convex surface of the section, and provided a transversely extending passageway 10 similar in size and construction to the passageway 7 formed by the sleeve 6. Provided on the section C, as by striking out a portion of the metal, is a plurality of spaced apart outwardly extending projections or tongues 11 which extend radially of the section in abrupt angular relation, and then in a general direction toward the sleeve portion 9. These projections are so arranged in spaced apart relation that when the under side of one of the intermediately disposed lugs as indicated at 11ª engages in surface contact with the wall of the last aperture in the section B, the abrupt outer convex surface of the terminally disposed tongue 11ᵇ will engage in surface contact with the wall of its respective aperture, thus permitting of the sections being snapped together throughout their greater range of adjustment and retained in their adjusted relation without liability of the sections becoming separated prior to the actual clamping of the device about a hose. These projections or tongues 11 are preferably spaced equidistant as that of the apertures in the outer section B, and it can be seen that, owing to the different radii of the sections B and C; when the sections are arranged in assembled relation the tongues 11ª and 11ᵇ will engage the walls of their respective apertures as illustrated in Figure 2, while the intermediate tongue does not engage the wall of its co-acting aperture. This snapping action is obtainable whenever three or more of the tongues are employed for adjustment of the clamp.

Pressed inwardly at points adjacent each end of the inner section C, are inwardly projecting lugs 12 having relatively flat confronting abutment faces extending in a line circumferentially of the clamp. These lugs 12 are adapted to receive and retain a segmental shaped lap ring 13 in position to provide an efficient clamping or binding action on the hose throughout its entire circumference. It can be seen that this ring 13, which may be formed of spring wire, spans the gap between the ends of the inner section C and thus forms a continuous band for snug fitting engagement about the hose D.

Referring now to the attaching or operating means F, the same preferably embodies a pair of straight pins 14 and 15 which are adapted for detachable positioning in the passageways 7 and 10 of the rolled sleeves 6 and 9 respectively, and which pins are of a length so that the ends thereof will extend outwardly past the side marginal edges of the clamp A. It will here be noted that it is desirable but not essential to form the clamp sections of equal width throughout their length. An attaching fulcrum bar 16 which is provided as a part of the means F, and which may be stamped from sheet metal of a suitable gauge, has one end thereof bifurcated to provide parallel spaced apart fingers or arms 17 and 18, so spaced as to permit of the clamp sections passing freely between the arms. These arms 17 and 18 which are substantially S shaped, are adapted to be disposed with the terminal arcuate portions 19 and 20 in overlying relation with the projecting end portions of the pin 15, and with the oppositely arcuated intermediate portions disposed below the projecting ends of the pin 14. When in this position, it is obvious that when the handle portion 21 is swung toward the rolled sleeve 9, with the axis of the pin 15 as a fulcrum point, the intermediate portions of the arms 17 and 18 will move the free end portion of the section B into overlapping interconnected engagement with the free end portion of the section C. It will also be obvious that when the rolled end 6 has been drawn to a most forward position to engage the roll 9 of the section C, the rolled ends or sleeves 6 and 9 cooperate as interengaging latch parts to prevent disconnection of the clamp from about the hose.

The object in so providing the flattened portion 8 is to permit of an angular portion being formed directly outwardly of the rolled sleeve 9 so that the strain from the line of contact of the section B with the hose D, will be transmitted to the outer surface of the sleeve 9 for drawing the sleeve 9 into firm contact with the hose D.

It will be apparent that after the clamp has been positioned in binding engagement about the hose D, the pins 14 and 15 and the fulcrum bar 16 may be removed, and incident to the fact that the force with which the sections B and C are tensioned or clamped is circumferential of the hose, there will be no liability of accidental disconnection of the interconnected rolled sleeves 6 and 9.

From the foregoing description of this invention it will be apparent that an efficient two part hose clamp has been provided embodying novel attaching features whereby the clamp may be expeditiously positioned in operative relation about a hose, and embodying a novel arrangement whereby the separable sections may be snapped together throughout the greater range of adjustment, so that they retain their assembled relation without liability of falling apart prior to actual clamping of the device about a hose.

Changes in detail may be made to the specific form of the invention herein shown and described, without departing from the spirit of the invention or the scope of the following claims.

I claim:—

1. A device of the class described comprising a pair of arcuate semi-circular sections adapted to be snapped together in various co-extensive adjusted positions and releasably held against circumferential movement in either direction one with respect to the other for forming bands of various diameters, and means provided at the normally free ends of the sections for drawing the band into binding engagement about an element.

2. A device of the class described comprising an arcuate semi-circular section having a sequence of equidistantly spaced apart apertures, a second arcuate semi-circular section having a plurality of equidistantly spaced apart tongues adapted for yieldably interfitting in the apertures of said first section in a manner for releasably retaining the sections against circumferential movement in either direction one with respect to the other in co-extensive adjusted relation, and means connecting the normally free ends of the sections together for retaining the device in binding engagement about an element.

3. A device of the class described comprising an arcuate semi-circular section provided with a sequence of equidistantly spaced apart transverse apertures, a second semi-circular section of slightly smaller radius than said first mentioned section and having a sequence of outwardly struck tongues extending in a line circumferentially of the section and being so spaced that when one of the tongues engages one wall of the terminally disposed aperture the terminally disposed tongue of the section will engage in its respective aperture in a manner for releasably retaining the sections against circumferential movement in either direction one with respect to the other in adjusted co-extensive relation, and means provided at the normally free ends of the sections for drawing the sections into binding engagement about an element.

4. A device of the class described comprising an arcuate semi-circular band provided with a plurality of equidistantly spaced apart apertures having straight walls extending transversely of the band, a second arcuate semi-circular band having a plurality of equidistantly spaced apart tongues struck outwardly in abrupt angular relation from the band and extending arcuately in a general direction toward the normally free end of the band, said tongues being spaced equidistant as the apertures in the first mentioned band so that when the band sections are disposed in co-extensive relation the inner surface of one tongue will engage one wall of a desired aperture and the outer arcuate wall of the terminally disposed tongue will snap into engagement with its respective aperture for releasably retaining the sections in adjusted co-extensive relation, and means for drawing and retaining the sections in binding engagement about an element.

5. A device of the class described comprising a clamping band respectively provided at its free end portions with inwardly and outwardly extending transversely apertured lugs, pins removably disposed in said apertures and extending from each side of the lugs, and a lever having spaced apart arms provided at their free ends with transversely aligned segmental arcuate portions adapted to bear upon the projecting ends of one of said pins whereby upon movement of the lever the intermediate portions of the arms will engage the pins of the companion lug for drawing the lugs into interlocking relation.

6. In a device of the class described, the combination of a clamping band having means provided at the free ends thereof for drawing the band into binding engagement about a yieldable element, and a segmental shaped lap ring held against lateral shifting movement inwardly of the band but capable of circumferential shifting within the band, spanning the joint of the band for providing an efficient binding action on the yieldable element throughout its entire circumference.

7. In a device of the class described, the combination of a clamping band having means provided at the free ends thereof for drawing the band into binding engagement about a yieldable element, inwardly projecting lugs formed at each side of the ends of the band and having relatively flat abutting faces extending in a line circumferentially of the band, and a segmental shaped spring wire held in circumferential alignment inwardly of the band by said lugs and adapted to span the joint of the band for providing an efficient binding action on the yieldable element throughout its entire circumference.

RALPH W. PHILBROOK.